3,658,960
COMPOSITIONS CONTAINING 1,3-DICYANO-TETRACHLOROBENZENE USED IN COCCIDIOSIS TREATMENT
Roelof van Hes, Weesp, Netherlands, assignor to U.S. Philips Corporation, New York, N.Y.
No Drawing. Filed May 25, 1970, Ser. No. 40,391
Claims priority, application Netherlands, May 27, 1969, 6908065
Int. Cl. A61k 27/00
U.S. Cl. 424—304     7 Claims

ABSTRACT OF THE DISCLOSURE

It has been found that 1,3-dicyanotetrachlorobenzene can be used to control and/or prevent coccidiosis in poultry. The substance can be administered as an admixture to the feed or the drinking water. The substance may be added to the feed in the form of a constituent of a premix. In general, the feed contains from 5 to 250 p.p.m., as a rule from 10 to 100 p.p.m., of the substance. If the substance is administered in the drinking water, the concentration may be halved.

---

The invention relates to a method of producing preparations and feeds for preventing and/or controlling coccidiosis. Coccidiosis is a disease which frequently occurs, in particular in poultry. The disease, the symptons of which are diarrhoea and bleeding, is caused by the mucous membranes of the intestinal tract, for example the caecum or the liver, being attacked by parasitic protozoa of the genus Eimeria, such as *E. tenella, E. necatrix, E. maxima, E. acervulina, E. mivati, E. brunetti* and others. Since the disease, if no steps are taken to control it, results in a poor weight increase, a reduced feed efficiency, a reduced egg production or even to mortality, it will be clear that efficient control is of high economic importance. Especially the control of the species which occur in the caecum, namely *E. tenella* and *E. necatrix* is highly desirable, since the coccidiosis caused by these protozoa involves a high mortality. For this reason, the activity of a substance frequently is first tested on growing chickens which have been artificially infected with *E. tenella*.

The prepaartions are administered to poultry, such as domestic fowls and turkeys, as an admixture to the food or the drinking water. Since such preparations are usually employed as a prophylactic, and therefore not only after an infection has taken place, it will be appreciated that the preparations administered in the said manner must satisfy the requirement of not altering the taste of the food or the drinking water in a degree such as to impair the food consumption. In general, it is important that the effective dose is small, and the preparation should not give rise to toxic phenomena, even when administered in effectvie amounts for a prolonged period. In the case of once-only administration, it is important that the effective dose should be small compared with the toxic dose, which usually is designated by $LD_{50}$, i.e. the single dose at which one half of the number of animals treated dies as a result of the preparation.

It has now been found that 1,3-dicyanotetrachlorobenzene is particularly effective in preventing and controlling coccidiosis and also eminently satisfies the other requirement.

In tests on chickens which had been artificially infected with *Eimeria tenella* it was found that when the said product was administered together with the feed there was no mortality and the weight increase was normal. When untreated feed was given there was a comparatively large mortality, and the weight increase of the surviving animals was reduced.

Although the amount required for a satisfactory result depends upon the degree of infection and upon the duration of the treatment, it has been found that dosages of from 5 to 250 p.p.m. (parts per million parts by weight) calculated with respect to the feed are effective for controlling coccidiosis, and as a rule concentrations of from 10 to 100 p.p.m. are sufficient. Since, expressed in parts by weight, the fowls consume about twice as much drinking water as food, administration in the drinking water will require smaller doses. The 1,3-cyanotetrachlorobenzene may be directly admixed to the food in the aforementioned concentration. However, it is desirable for the product to be first processed into concentrates or feed additives which contain comparatively large amounts, for example from 5 to 50 percent by weight, of the active constituent, and further, as the case may be, vitamins, minerals, antibiotics and other medicaments. Suitable diluents are any inert constituents which can safely be administered to the fowls or normal constituents of the finished feed. Suitable diluents are ground calcium phosphate or calcium carbonate, ground shells, attapulgite, meal, such as maize meal, citrus meal, fermentation residue, maize cob meal, soya bean meal and the like.

The coccidiostatic activity of the substance was found in a test in which two-week-old chickens (Cobbs) which had been raised on normal rations and which had about equal weights, were infected with 75,000 sporulated oocysts of *Eimeria tenella* each. From these animals two groups were formed, care being taken that the compositions and the weights of the groups were as equal as possible. The first group (A) was then kept on normal rations for eight days, whereas the second group (B) during the same period was given a diet comprising the same feed to which, however, 125 p.p.m. of 1,3-dicyanotetrachlorobenzene had been added. The weight of each animal was determined both at the commencement of the test and eight days after the infection. Also, the mortality of each group was determined.

The difference between the initial and final weights is a measure of the mean weight increase of the animals.

A chicken feed prepared according to the invention may have the following composition:

|  | G. |
|---|---|
| Maize meal | 29.24 |
| Husked barley meal | 20.00 |
| Husked oatmeal | 20.00 |
| Coarse soya meal | 8.00 |
| Sesame meal | 4.00 |
| Wheat middlings | 5.00 |
| Norwegian herring meal | 9.00 |
| Whey powder | 2.50 |
| Chicken minerals | 1.50 |
| Vitamin $AD_3$ preparation | 0.25 |
| Vitamin B preparation | 0.50 |
| 1,3-dicyanotetrachlorobenzene | 0.01 |

An example of a premix which may be added to chicken feed in an amount of 1 g. per kg. is the following mixture:

| | | |
|---|---|---|
| Vitamin A | I.U. | 7,500,000 |
| Vitamin $D_3$ | I.U. | 1,500,000 |
| Vitamin E | I.U. | 5,000 |
| Vitamin $K_3$ | mg. | 1,500 |
| Vitamin $B_2$ | mg. | 3,000 |
| Pantothenic acid | mg. | 4,000 |
| Nicotinic acid | mg. | 15,000 |
| Vitamin $B_6$ | mg. | 300 |
| Vitamin $B_{12}$ | mg. | 8 |
| Fe | mg. | 20,000 |
| Mn | mg. | 40,000 |
| Cu | mg. | 3,000 |
| I | mg. | 300 |
| Zn | mg. | 15,000 |
| Choline chloride | mg. | 150,000 |
| Vitamin C | mg. | 20,000 |
| 1,3-dicyano-tetrachlorobenzene | g. | 100 |
| Carrier, to 1,000 g. | | |

The premix may contain a mixture of 1,3-dicyanotetrachlorobenzene and poultry feed ingredients in the weight ratio of 1:2 to 1:20.

What is claimed is:

1. A composition for the prevention and control of coccidiosis in poultry which composition comprises a poultry feed containing vitamins and minerals suitable for poultry and mixed therein an anticoccidial amount of 1,3-dicyanotetrachlorobenzene.

2. The composition of claim 1 wherein the 1,3-dicyanotetrachlorobenzene is present in an amount of from 5 to 250 parts per million.

3. The composition of claim 1 wherein the 1,3-dicyanotetrachlorobenzene is present in an amount of from 10 to 100 parts per million.

4. A poultry feed premix suitable for imparting anticoccidial properties to a poultry feed said premix comprising a mixture of 1,3-dicyano-tetrachlorobenzene and poultry suitable mineral and vitamin containing poultry feed ingredients in the weight ratio of about 1:2 to 1:20.

5. A method of preventing and controlling coccidiosis in poultry which method comprises orally administering to said poultry an anticoccidial effective amount of 1,3-dicyanotetrachlorobenzene.

6. The method of claim 5 wherein the 1,3-dicyanotetrachlorobenzene is administered in the feed for said poultry.

7. The method of claim 5 wherein the 1,3-dicyanotetra-chlorobenzene is administered in the drinking water for said poultry.

References Cited

UNITED STATES PATENTS 3,331,735    7/1967    Battershell et al. ____ 424—304

OTHER REFERENCES

Mills et al.: Chem. Abst., vol. 70 (1969), p. 19209s.

SAM ROSEN, Primary Examiner